United States Patent
Hu et al.

(10) Patent No.: US 12,342,207 B2
(45) Date of Patent: Jun. 24, 2025

(54) SECONDARY CELL DISCOVERY IN ENERGY SAVING NETWORK

(71) Applicant: Samsung Electronics Co., Ltd., Gyeonggi-do (KR)

(72) Inventors: Liang Hu, San Diego, CA (US); Jung Hyun Bae, San Diego, CA (US); Philippe Jean Marc Michel Sartori, Naperville, IL (US)

(73) Assignee: Samsung Electronics Co., Ltd (KR)

( * ) Notice: Subject to any disclaimer, the term of this patent is extended or adjusted under 35 U.S.C. 154(b) by 381 days.

(21) Appl. No.: 18/114,685

(22) Filed: Feb. 27, 2023

(65) Prior Publication Data

US 2023/0337033 A1 Oct. 19, 2023

Related U.S. Application Data

(60) Provisional application No. 63/408,084, filed on Sep. 19, 2022, provisional application No. 63/331,224, filed on Apr. 14, 2022.

(51) Int. Cl.
| | |
|---|---|
| *H04W 24/10* | (2009.01) |
| *H04L 5/00* | (2006.01) |
| *H04W 52/02* | (2009.01) |
| *H04W 72/23* | (2023.01) |

(52) U.S. Cl.
CPC .......... *H04W 24/10* (2013.01); *H04L 5/0051* (2013.01); *H04W 52/0232* (2013.01); *H04W 72/23* (2023.01)

(58) Field of Classification Search
CPC . H04W 24/10; H04W 52/0232; H04W 72/23; H04L 5/0051
See application file for complete search history.

(56) References Cited

U.S. PATENT DOCUMENTS

| | | | |
|---|---|---|---|
| 9,730,097 B2 | 8/2017 | Yu et al. | |
| 10,375,699 B2 | 8/2019 | Jeon et al. | |
| 11,026,141 B2 | 6/2021 | Axmon et al. | |
| 11,297,674 B2 | 4/2022 | He et al. | |
| 2015/0009898 A1* | 1/2015 | Rosa | H04L 5/0048 370/328 |
| 2015/0117271 A1* | 4/2015 | Liang | H04L 5/0055 370/280 |
| 2019/0261444 A1* | 8/2019 | Axmon | H04W 76/28 |
| 2021/0274451 A1* | 9/2021 | Lei | H04W 8/24 |

(Continued)

OTHER PUBLICATIONS

Huawei, "New SI: Study on network energy savings for NR", 3GPP TSG RAN Meeting #94e RP-213554 Electronic Meeting, Dec. 6-17, 2021 (revision of RP-212709), pp. 4.

(Continued)

*Primary Examiner* — Fahmida S Chowdhury
(74) *Attorney, Agent, or Firm* — The Farrell Law Firm, P.C.

(57) ABSTRACT

A system and a method are disclosed for performing communication by receiving a light reference signal (RS) on a carrier frequency where a synchronization signal block (SSB) is not detected; in response to receiving the light RS, obtaining a light RS measurement and transmitting a light RS measurement report based on the light RS measurement; and starting to receive at least one SSB on the carrier frequency based on the light RS measurement report.

20 Claims, 12 Drawing Sheets

(56) References Cited

U.S. PATENT DOCUMENTS

| | | |
|---|---|---|
| 2022/0116924 A1* | 4/2022 | Takeda .................. H04W 76/15 |
| 2022/0200746 A1* | 6/2022 | Sakhnini ................ H04L 5/0037 |
| 2022/0408479 A1* | 12/2022 | Wang .................. H04W 74/006 |
| 2022/0416955 A1* | 12/2022 | Xue ...................... H04W 72/23 |
| 2023/0007603 A1* | 1/2023 | Sui ..................... H04W 72/0453 |
| 2023/0035261 A1* | 2/2023 | Duan ...................... H04L 67/04 |
| 2025/0024492 A1* | 1/2025 | Kazmi ................ H04W 68/005 |

OTHER PUBLICATIONS

ETSI TS 138 214 V16.5.0 (Apr. 2021), Technical Specification, 5G; NR; Physical layer procedures for data (3GPP TS 38.214 version 16.5.0 Release 16), pp. 159.

ETSI TS 138 331 V16.4.1 (Apr. 2021), Technical Specification, 5G; NR; Radio Resource Control (RRC); Protocol specification (3GPP TS 38.331 version 16.4.1 Release 16), pp. 932.

* cited by examiner

SECONDARY CELL DISCOVERY IN ENERGY SAVING NETWORK

CROSS-REFERENCE TO RELATED APPLICATIONS

This application claims the priority benefit under 35 U.S.C. § 119(e) of U.S. Provisional Application No. 63/331,224, filed on Apr. 14, 2022, and U.S. Provisional Application No. 63/408,084, filed on Sep. 19, 2022, the disclosures of each of which are incorporated by reference in their entireties as if fully set forth herein.

TECHNICAL FIELD

The disclosure generally relates to a wireless communication network. More particularly, the subject matter disclosed herein relates to improvements to network side energy saving for the wireless communication network.

SUMMARY

Cellular systems are increasing in complexity. Many cellular systems are designed to have denser networks, larger operating bandwidths, and many antennas. As a consequence, power consumption of cellular networks has increased and is a major part of an operators' operating expenses (OPEX).

While solutions for power consumption reduction for user equipment (UE) have been proposed, advancements for reducing power consumption on the network side has been inconsistent. In Release 18 (Rel-18) 3rd Generation Partnership Project (3GPP), an organization that develops standards for mobile telecommunications, has initiated a study on reducing power consumption at the network level.

New radio (NR) is a term used to refer to the next generation of cellular wireless technology that is being developed by 3GPP. NR is expected to be a key component of fifth generation (5G) mobile wireless technology, and will offer a wide range of new capabilities and features, such as higher data rates, lower latency, and improved efficiency. NR will also be designed to support a wide range of use cases and applications, including enhanced mobile broadband, massive machine type communication, and ultra-reliable low-latency communication. In addition, NR advancements may be used to reduce power consumption on the network side.

In legacy NR, cells (e.g., primary cells (PCells)) may continuously transmit synchronization signal block (SSB) signals and broadcast system information block 1 (SIB1) information, regardless of the traffic activity of the cell. In frequency range 1 (FR1), an NR cell may provide a relatively large coverage with only a small chance that there is not an active device in the cell, thereby causing continuous transmissions of reference signals. However, in a dense deployment area with a large number of small cells at frequency range 2 (FR2), some cells may not serve UEs. In such dense, small area cell scenarios, selectively turning off cells may provide significant gains in reduced network energy consumption. The faster a cell is turned on or off, the more efficiently it can follow the traffic dynamics and the larger the power saving gains can be. Therefore, in order to reduce network energy consumption, a physical signal and protocol procedure to conveniently turn on and off network nodes as desired is needed.

To overcome these issues, systems and methods are described herein for a physical signal and protocol procedure. For example, a light references signal (RS) can be designed to enable a secondary cell (SCell) discontinuous transmission (DTX) mode. A DTX mode may be used to reduce the amount of power consumed by the UE or base station and to improve the efficiency of the network. When a UE or base station is in the DTX mode, it will only transmit data when it has data to send, and it will remain silent at other times.

When the SCell is in a power savings mode, it may transmit the light RS alone. In addition, the SCell may avoid sending a synchronization signal block (SSB), and the light RS may avoid carrying the master information block (MIB)/physical broadcast channel (PBCH).

Additionally, the transmitted light RS may be used to detect SCells in a DTX off mode. Accordingly, the SCell may avoid transmitting the light RS for beam sweeping or radio resource management (RRM) measurements at the SCell in order to maximize SCell energy savings. In addition, the SCell may use the light RS for beam sweeping of the RRM measurements to further reduce the network energy.

The above approaches improve on previous methods because energy is saved on the network side instead of the client side. In particular, network energy may be saved by not transmitting the SSB because the light RS transmissions may be much more infrequent than transmissions for the SSB, thereby requiring less energy for transmission. Also, network energy may be saved since beam sweeping of RRM measurements may be performed without repeatedly transmitting RSs in different beam directions.

According to an aspect of the disclosure, a method for performing communication includes receiving a light RS on a carrier frequency where an SSB is not detected; in response to receiving the light RS, obtaining a light RS measurement and transmitting a light RS measurement report based on the light RS measurement; and starting to receive at least one SSB on the carrier frequency based on the light RS measurement report.

According to another aspect of the disclosure, a UE is configured to perform communication. The UE includes a processor and a memory storing program instructions that, when executed by the processor, configure the UE to receive a light RS on a carrier frequency where an SSB is not detected, in response to receiving the light RS, obtain a light RS measurement and transmit a light RS measurement report based on the light RS measurement, and start to receive at least one SSB on the carrier frequency based on the light RS measurement report.

According to another aspect of the disclosure, a method for activating an SCell includes receiving an RS to initiate a wake up signal (WUS) transmission on a carrier frequency where an SSB is not detected, in response to receiving the RS, transmitting a WUS to the SCell, and starting to receive at least one SSB on the carrier frequency based on a WUS measurement obtained in response to the transmission of the WUS.

According to another aspect of the disclosure, a UE is configured to activate an SCell. The UE includes a processor and a memory storing program instructions that, when executed by the processor, configure the UE to receive an RS to initiate a WUS transmission on a carrier frequency where an SSB is not detected, in response to receiving the RS, transmit a WUS to the SCell, and start to receive at least one SSB on the carrier frequency based on a WUS measurement obtained in response to the transmission of the WUS.

BRIEF DESCRIPTION OF THE DRAWINGS

In the following section, the aspects of the subject matter disclosed herein will be described with reference to exemplary embodiments illustrated in the figures, in which.

DETAILED DESCRIPTION

Figure 1:
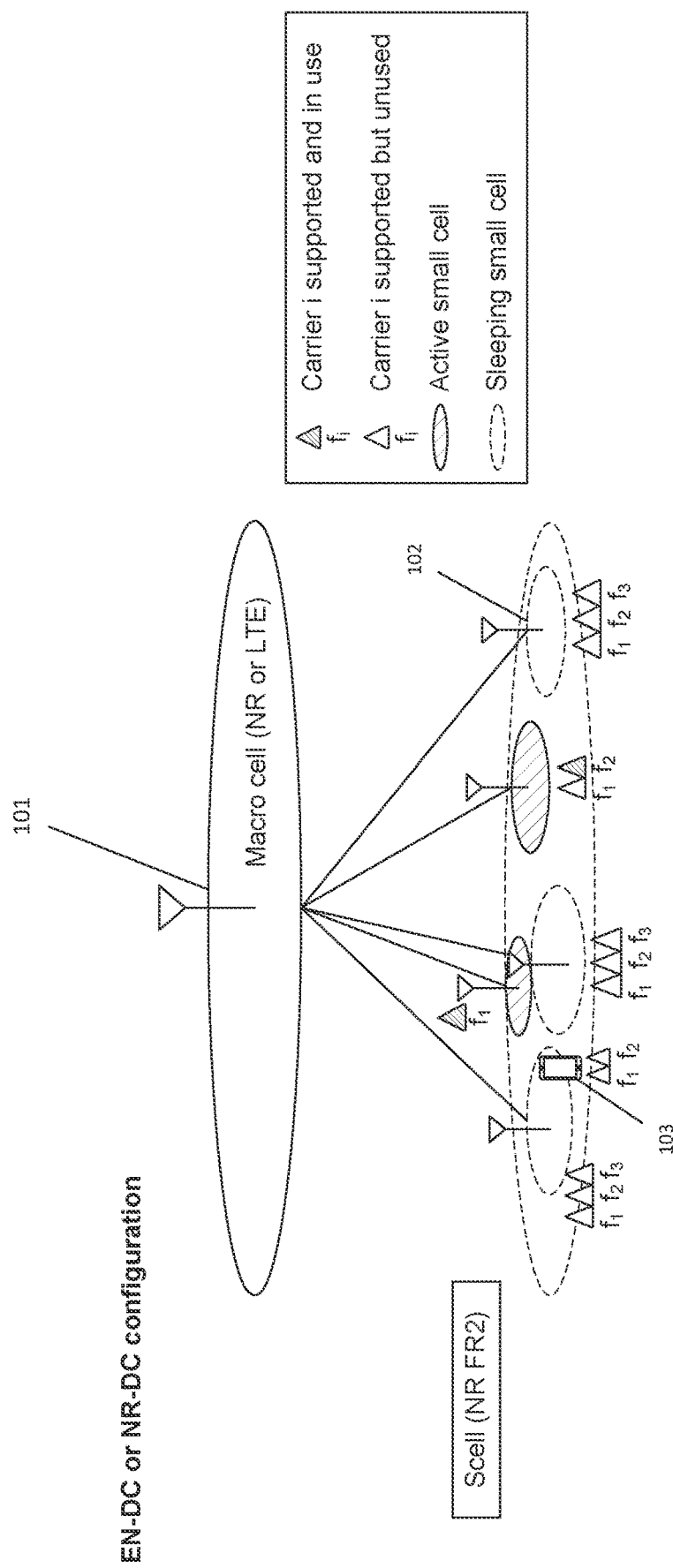
FIG. 1 illustrates an ethernet (EN)-dual connectivity (DC) or NR-DC network configuration, according to an embodiment.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

A PCell may be a type of cell that is used to provide coverage and capacity to 5G devices. It may be the primary source of communication for 5G devices, and it is responsible for transmitting and receiving data to and from the devices.

A cell may be a geographic area covered by a wireless network, and it may be served by a base station, which is responsible for transmitting and receiving data to and from UEs within its coverage area.

In a 5G network, a PCell may be used to provide coverage and capacity to 5G devices using a specific frequency band and radio access technology (RAT). The PCell may be the main source of communication for the devices, and responsible for transmitting and receiving data to and from the devices.

In addition to the PCell, a 5G network may also include SCells, which are used to provide additional coverage and capacity to the devices. These cells may use different frequency bands and radio access technologies than the primary cell, and they may be used to offload traffic from the primary cell or to provide coverage in areas where the primary cell has limited or no coverage. It may also be used to provide additional capacity to the network in areas with high demand. Secondary cells may use different frequency bands and radio access technologies than the primary cell, and they may be deployed in a variety of configurations depending on the needs of the network.

An SCell group (SCG) is a group of SCells that are used to provide additional coverage and capacity to 5G devices. An SCell group (SCG) of a non-standalone (NSA) UE may be an NR cell group configured on the NR side. A PCell of the NSA UE may be a cell that is served by the master eNodeB (MeNB) and that the UE is camping on. A PCell may initiate initial access. A primary SCG cell (PSCell) of the NSA UE may be a PCell that is served by the secondary gNodeB (SgNB) and configured for the UE through a radio resource control (RRC) message sent by the MeBN. The PSCell may stay active for as long as it is configured successfully. A PSCell may be a cell for which initial access is initiated under the SCG. An SCell of the NSA UE may be a cell configured for the UE through an RRC message sent by the MeNB. The SCell may provide the UE with additional radios resources.

A master cell group (MCG) and the SCG are concepts in dual connectivity (DC). It may be understood that the MCG is located in a group of a cell in which the UE first initiates random access (RACH). If there is no dual link, there is no concept of MCG and SCG. Alternatively, it may be understood that if dual link is not performed, the cell group corresponds to the MCG.

FIG. 1 illustrates an EN-DC or NR-DC network configuration, according to an embodiment.

Referring to FIG. 1, in an EN-DC or NR-DC network configuration, the macro cell 101 (PCell) may provide wide coverage. Various frequencies $f_i$ may or may not be supported and in use at different SCell 102 areas, as indicated by the patterning in FIG. 1. In addition, some SCells may be in an active state and some small cells may be in a sleeping state, as indicated by the patterning in FIG. 1. More than one SCell 102 may be located in the coverage area of the PCell 101. In addition, a UE 103 is shown to be near the outer perimeter of an SCell. Although the UE 103 is illustrated as a cellular phone, other types of UEs may be used.

SCells (excluding the PSCells) can be added/removed by the PCell via RRC reconfigurations to provide additional capacity while UEs are moving. Compared with legacy NR SCell activation/deactivation, in the energy saving network, a large number of SCells (including PSCells) may be in a "DTX mode", which means that they may only transmit light RS instead of legacy RS if they are not serving any UE. This is illustrated in FIG. 1, where the active small cells may be transmitting legacy RSs and the sleeping small cells may be transmitting light RS.

Figure 2:
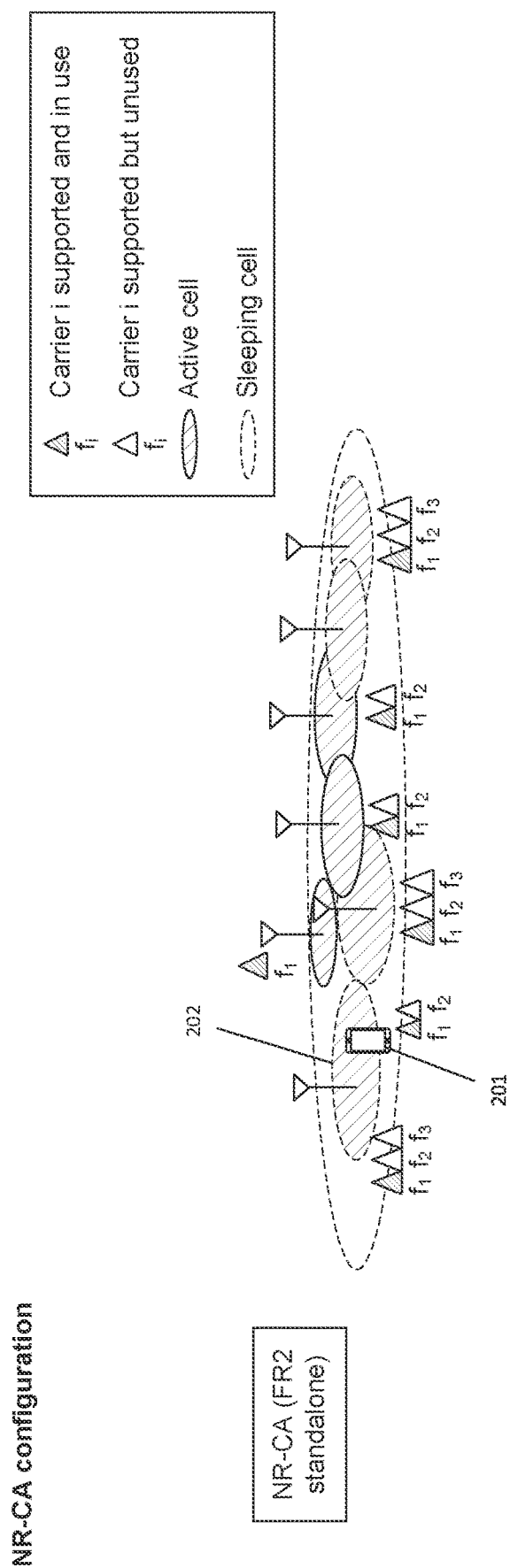
FIG. 2 illustrates an NR-carrier aggregation (CA) network configuration, according to an embodiment.

FIG. 2 illustrates an NR-CA network configuration, according to an embodiment.

In order for the UE to discover PCell or SCell component carrier beams efficiently in sleep mode, a new UE UL WUS transmission may be used to wake up PCell or SCell in the sleep mode. Additionally or alternatively, a UE may be configured to monitor for light RS, and switch to monitor on-demand SSB once a cell is set to a "DTX on" mode.

Referring to FIG. 2, in an NR-CA network configuration, various carrier frequencies $f_i$ may or may not be supported and in use, as indicated by the patterning in FIG. 2. In addition, some cells may be in an active state and some cells may be in a sleeping state, as indicated by the patterning in FIG. 2.

The NR-CA network configuration may focus on the standalone FR2 CA deployment scenario, also taking into account green field deployment of Release 18 (Rel-18) UEs. A potential difference between FIGS. 1 and 2 may be that the UE 201 cannot rely on a macro base station (the PCell) to provide umbrella coverage over multiple smaller base stations (SCells). In this configuration, embodiments of the SCells in the DTX mode may not include a PSCell, which may be responsible for providing a layer 3 (L3) handover when UEs are moving.

In order to wake up an SCell 202, a downlink-centric approach may be used where the SCell sends a signal that can be used by the UE and reported to a gNB. The signal may be a light RS that is infrequently sent (e.g., less frequently transmitted than legacy SSBs due to a decrease in beam sweeping). For example, the light RS may be sent once every second, which has a longer periodicity than a legacy SSB burst.

In addition, in order to wake up an SCell, a UL-centric approach may be used where the SCell does not send any signal or only sends light RSs, but performs measurements on a WUS sent by the UE.

The UL and DL solutions are not mutually exclusive and can be complementary, and ideally can be deployed in a combination. With embodiments of the UL design, the UE may transmit more signals, increasing UE power consumption. Thus, it may be preferable to deploy a DL-based solution if power consumption should be lowered. However, in some embodiments of the DL design, when the SCells are in the "DTX off" state, the SCells may still transmit a light RS for the UE to maintain synchronization to that carrier or perform a measurement (e.g., a mobility related measurement). Without any active mobility handling, there may be a significant risk that a device may have left the coverage area of an SCell without the network being aware of it. In one case, the cell in sleep mode does not transmit a DL RS, and only upon detecting the WUS from the UE, the cell switches from "DTX off" mode to "DTX on" mode where the legacy RS (e.g., legacy SSB or SIB1 (for a PCell)) is transmitted. Thus, the DL solution may be preferable at low speeds, and the UL solution may be more suitable for high mobility.

When the cell is an SCell, it may be accessible only by Rel-18 UEs, whereas the PCell can be accessible by both Release 17 (Rel-17) and Rel-18 UEs to maintain the legacy mobility procedure.

For the DL design, the light RS should be designed to account for a large number of SCells in a DTX mode when a UE is moving. In addition, the downlink design should allow the UE to adequately perform RRM measurements and identify an appropriate SCell.

In the legacy NR, turning off an SCell may be possible in the NR CA framework, with a dormant bandwidth part (BWP) configured for UE power saving purposes. However, the SCells may still transmit the full legacy SSB signals for RRM measurements and active state mobility control, which can consume a lot of power on the network side.

The present disclosure provides a design of an SCell DTX mode with light RSs transmitted when there is no UE served for network energy saving. Some embodiments of the disclosure may have no transmission of the legacy SSB signals on the SCell. In addition, some embodiments may more rapidly switch the DTX mode on/off of SCells in a dense deployment area (e.g., on/off on a slot level, such that the transition from an "off" state to an "on" state for an SCell is fast enough for any dynamic traffic variations). Furthermore, in some embodiments a UE WUS may be transmitted to wake up the cells in sleep mode by only transmitting a light RS for network energy saving.

For the UL design, when the WUS is sent by the UE to turn on/off the SCell, a large number of SCells in a DTX mode when a UE is moving should be accounted for in the WUS design. In addition, the uplink design should allow the UE to adequately perform WUS transmissions and identify an appropriate SCell. Additionally, the UE transmissions may be sparce to reduce power consumption. Also, when the SCell is off, the UE may have no timing information for the SCell, and it may obtain the timing information by transmitting a light RS in case the UE does not have PCell or PSCell connectivity.

The function of light RS can be to allow a UE to get synced and make basic measurements of neighboring SCell signal strengths, such that the PCell can first down-select one or a subset of SCells to transmit legacy SSBs for beam sweeping (e.g., in the active state mobility procedure). The light RS can be designed such that it is transmitted in one beam or multiple beam directions, but not necessarily in 64 beam directions for a beam sweeping purpose in FR2. Then, the UE can make more accurate RRM measurements of legacy SSB transmitted from only a subset of SCells for active-mode mobility, beam management, or beam sweeping. In another embodiment, light RS can also be used to completely replace the legacy SSB for beam sweeping of the RRM measurements. If the light RS power signals are used for beam sweeping, power consumption may be expected to be higher. Other solutions (e.g., a UL-based solution for the WUS) can be used alone or in combination as well.

In some embodiments of the present disclosure, instead of allowing all SCells to transmit legacy SSB for beam sweeping all of the time, the light RS combined with legacy SSB transmissions can save both SCell SSB transmissions overhead and energy consumption.

Figure 3:
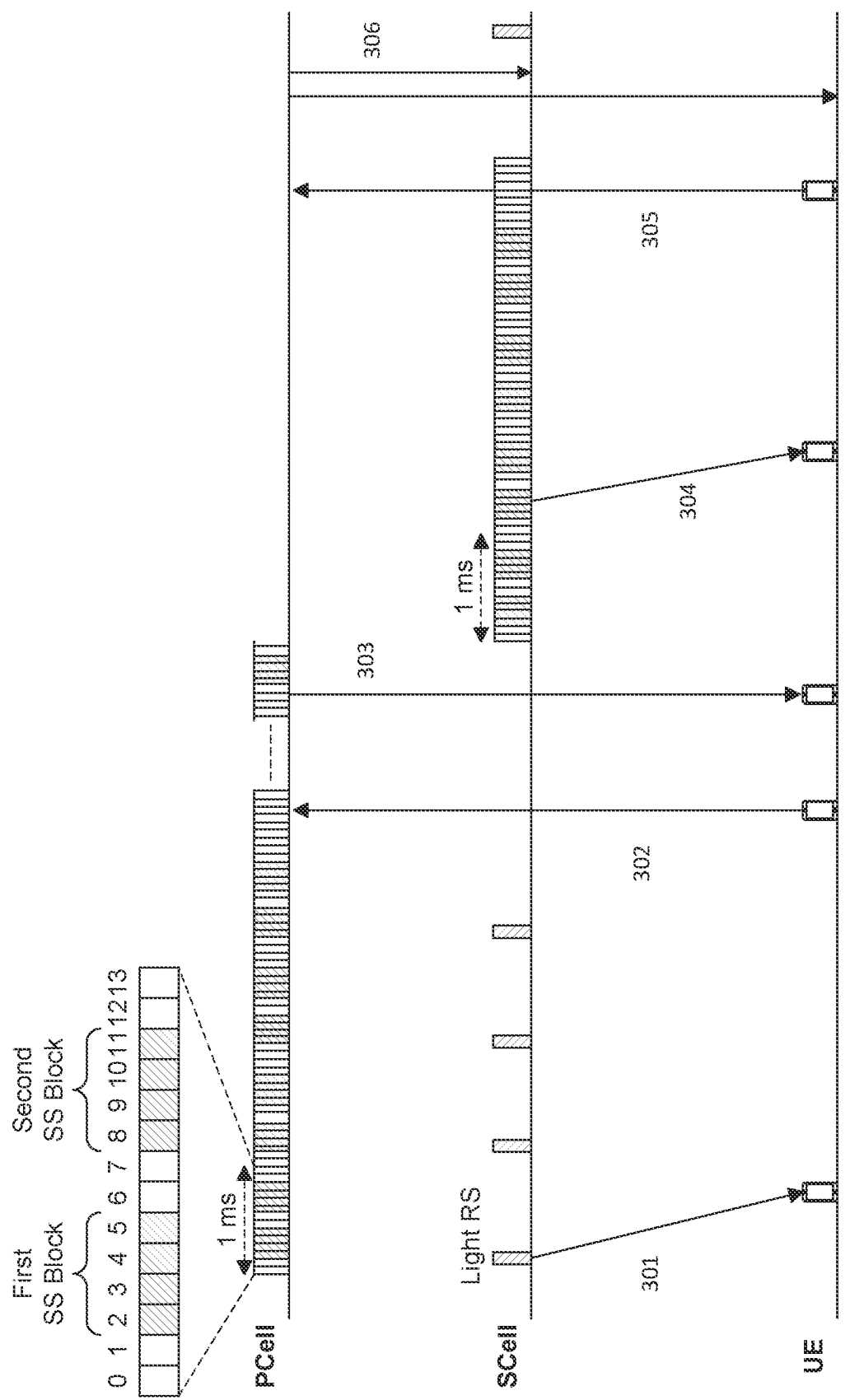
FIG. 3 illustrates a signal timing diagram of a downlink (DL)-based configuration, according to an embodiment.

FIG. 3 illustrates a signal timing diagram of a DL-based configuration, according to an embodiment.

Referring to FIG. 3, light RSs are transmitted infrequently by the SCells (instead of the full SSB sweeping for SCells) when no UE is connected. In step 301, a UE detects a light RS transmitted by an SCell and determines a light RS measurement of the SCell. In step 302, the UE transmits the light RS measurement report to the PCell. If the measurements indicate that the UE could be adequately served by at least one SCell, PCell may activate at least one SCell (or a set of SCells), and may turn on the legacy SSB transmission (including beam sweeping, if appropriate) for these SCells by transmitting DCI to the UE in step 303. The PCell (e.g., a gNB) may configure the UE with the measurement configurations of the at least one SCell and may perform beam sweeping using legacy procedures. In step 304, the UE calculates an on-demand SSB measurement. In step 305, the UE reports SSB measurements to the PCell using legacy procedures. The PCell may then make a final decision on which SCells and specific beam to activate for UE to use. In step 306, the PCell transmits DCI for deactivating one or more SCells.

Figure 4:
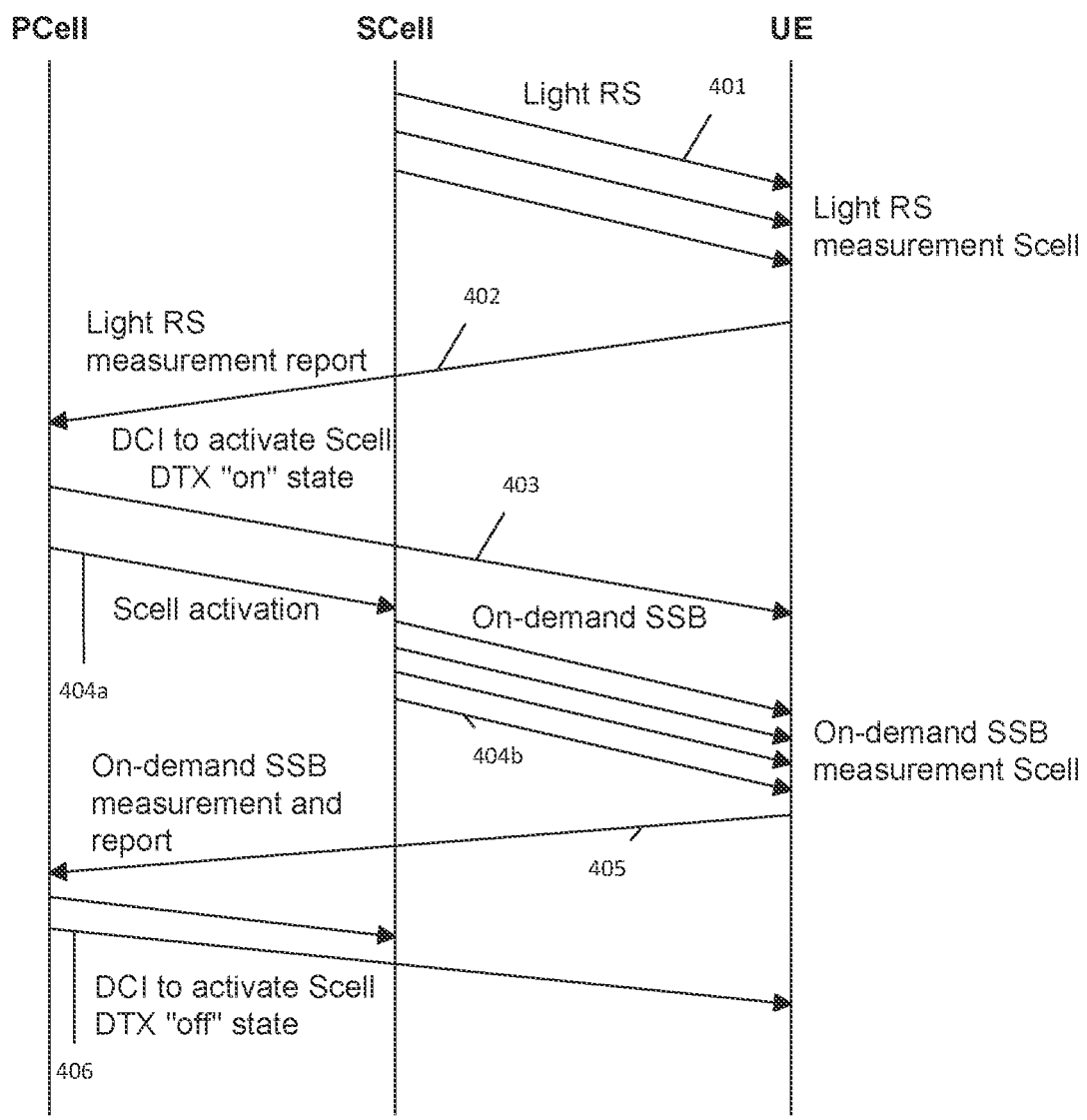
FIG. 4 illustrates a signaling exchange for a DL-based configuration, according to an embodiment.

FIG. 4 illustrates a signaling exchange for a DL-based configuration, according to an embodiment.

Referring to FIG. 4, in step 401 one or more light RSs are transmitted from an SCell to a UE. Step 401 corresponds to step 301 in FIG. 3. In step 402, the UE transmits a light RS measurement report to the PCell. Step 402 corresponds to step 302 in FIG. 3. In step 403, the PCell transmits DCI to the UE to activate one or more SCells by switching DTX to an "on" state. Step 403 corresponds to step 303 in FIG. 3. In step 404*a*, the PCell transmits an activation signal to the SCell. In step 404*b*, the SCell transmits one or more on-demand SSB measurement signals to the UE. Step 404*b* corresponds to step 304 in FIG. 3. In step 405, the UE transmits an on-demand SSB measurement and report to the PCell. Step 405 corresponds to step 305 in FIG. 3. In step 406, the PCell transmits DCI to switch the SCell DTX state to "off". Step 406 corresponds to step 306 in FIG. 3.

Figure 5:
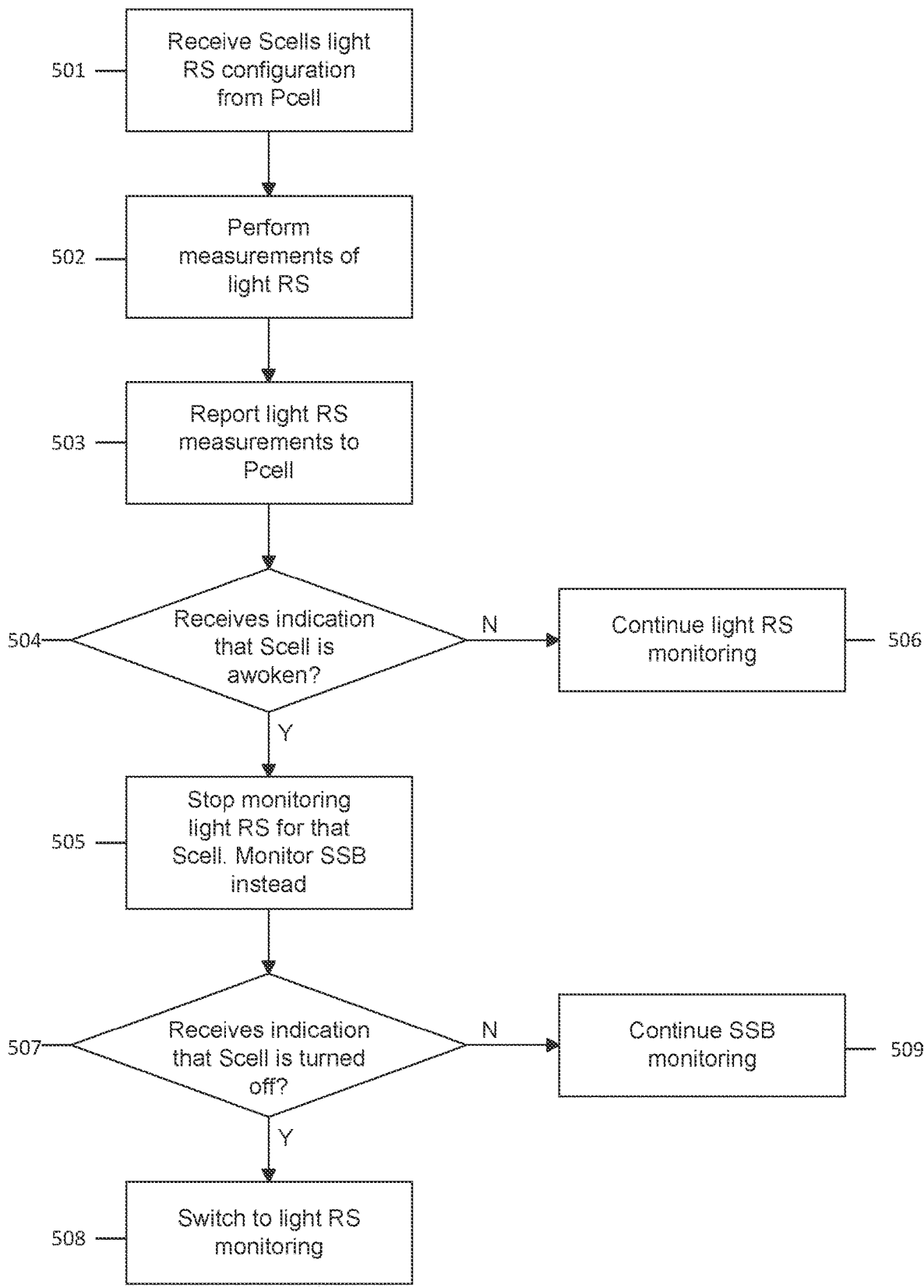
FIG. 5 illustrates a flowchart of a method for a DL-based configuration, according to an embodiment.

FIG. 5 illustrates a flowchart of a method for a DL-based configuration, according to an embodiment.

The steps of FIG. 5 may be performed by a UE, a processor, a controller, or another electronic device. Additionally, some of the steps may be performed simultaneously or in a different order from that which is shown.

Referring to FIG. 5, in step 501, an SCell light RS configuration is received from a PCell. For example, a UE may move into the coverage of one or more SCells, while it remains in an RRC-connected state with a PCell (a macro cell). The UE may be in an area where there is one or more SCells in a DTX "on" mode. In order to be able to detect SCells, the UE may receive a configuration from the network of the light RS configurations it can be expected to detect for a given carrier frequency. The UE may not previously detect SSB for the given carrier frequency. The configuration may be provided by RRC signaling (dedicated or common), and may include one or more of a transmission periodicity for the light RS, the frequency resources where the light RS is transmitted, a time interval when the UE can be expected to receive the light RS, an index of a light RS that uniquely identifies the light RS, and the corresponding SSB quasi co-location (QCL)-type D with the light RS. The gNB can update the light RS configurations by adding/removing light RSs to monitor and update the SSB for the UE to monitor.

In step 502, measurements of light RS are performed. For example, the UE may start measuring the light RS (RS received power (RSRP) or RS strength indicator (RSSI)) of all neighboring SCells according to the measurement configurations received earlier from PCell. The measurements can start when the UE receives the light RS configuration. In some embodiments, the light RS measurement can be activated/deactivated by a specific trigger (e.g., media access control (MAC) control element (CE) or DCI). The light RS measurement may include coarse acquisition of the cell in a DTX off state timing and an RSRP measurement based on the resource elements (REs) occupied by the light RS.

In step 503, light RS measurements are reported to the PCell. For example, the UE reports the SCell measurements to the PCell. The measurements may be reported via L1, configured grant type 1 (CG1), and/or RRC signaling.

L1 measurement reporting may include enhanced channel state information (CSI)-RS report for multi transmission and reception point (MTRP) transmission point selection and/or a new light RS report, based on the measurement report configuration received from the PCell before the measurements. L1 measurement reporting may be particularly useful if a fast wake up of the SCell is desirable.

CG1 measurement reporting may include, when receiving the light RS configuration, the UE can be configured with an associated set of resources for a CG1 (either in the same or in different messages). The UE can use the CG1 to report the measurements performed on the light RS (or light RSs if several measurements are bundled together). The UE may be configured to report the measurements only if they are above a power threshold. The UE may not even report a power or quality measurement, but simply send an indication that the SCell should be woken up.

If waking up the SCell is not that time-sensitive, the light RS measurements may be reported by RRC signaling. The RRC signaling measurement reporting may occur only if the signals are above a threshold.

In step 504, the UE determines whether an indication that an SCell is awoken has been received. The PCell (gNB) may send a message to the UE to indicate that the SCell has awoken.

The activation of legacy SSB transmission can be done by legacy SCell activation using a MAC-CE. This can be done using a MAC-CE indicating a legacy SSB activation, and may automatically deactivate the light RS monitoring associated with this SSB (an implicit indication). Additionally or alternatively, a MAC-CE may include an additional field to carry information on legacy SSB activation (an explicit indication).

The SCell can be activated or deactivated with new DCI. In some cases, it may be necessary to quickly wake up the SCell. In such cases, a solution may be to send physical layer signaling since it has a low latency. This may be enhanced by a design of a new DCI, described later in this disclosure.

RRC signaling may also be used by sending a new light RS configuration. When receiving the new light RS configuration, the UE may assume that a light RS that is not present anymore indicates that the corresponding SCell has been turned on.

In step 505, if the indication that the SCell is awoken has been received (Yes in step 504), then monitoring light RS for the SCell is stopped and SSB is monitored for instead. The UE may receive SSB for the carrier frequency and perform legacy SSB based RRM measurements, and may stop monitoring the associated light RS. If the UE has not received the awoken indication, the UE may continue to monitor the light RS. The UE may report, to the PSCell (gNB) the SSB-based measurements and/or the light RS-based measurements. Optionally, the gNB may also be capable of sending an indication that the SCell is turned off. This may not be necessary since most of the time, the network could decide to switch to another SCell when there is no traffic in the cell. Additionally, the previously described signaling to indicate "awoken" can also be used to indicate "turned off". When receiving such a message, the UE then may switch from the SSB to the light RS monitoring.

In step 506, if the indication that the SCell is awoken has not been received (No in step 504), then light RS monitoring is continued. In this case, the UE may not switch to legacy SSB reception after receiving DCI or MAC CE. The UE may continuously receive light RS from the SCell to perform RRM, radio link monitoring (RLM), and/or bidirectional forwarding detection (BFD) measurements, but with a different light RS configuration than the 1st stage cell discovery. For example, the different light RS configurations may enable the SCell and/or the UE to perform beam management procedures, where the light RS is transmitted in repetition with different beams.

In step 507, the UE determines whether an indication that the SCell is turned off is received. If the indication that the SCell is turned off is received (Yes in step 507), then the UE switches to light RS monitoring in step 508. If the indication that the SCell is turned off is not received (No in step 507), then the UE continues SSB monitoring.

As explained above, a fast decision to turn on an SCell may be proper. In order to perform such a fast decision, the gNB may use aperiodic light RSs. The presence of the aperiodic light RS may utilize a new DCI or a new DCI field. This field may be configured if the UE indicates it has the capability to process light RS, or aperiodic light RS. The operation for aperiodic CSI reporting can largely be reused. In particular, the legacy access point (AP) CSI-RS report configuration can be extended with a new measurement object of "light RS" in the CSI-Report config, as well as in the NZP-CSI-RS-ResourceSet.

Figure 6:
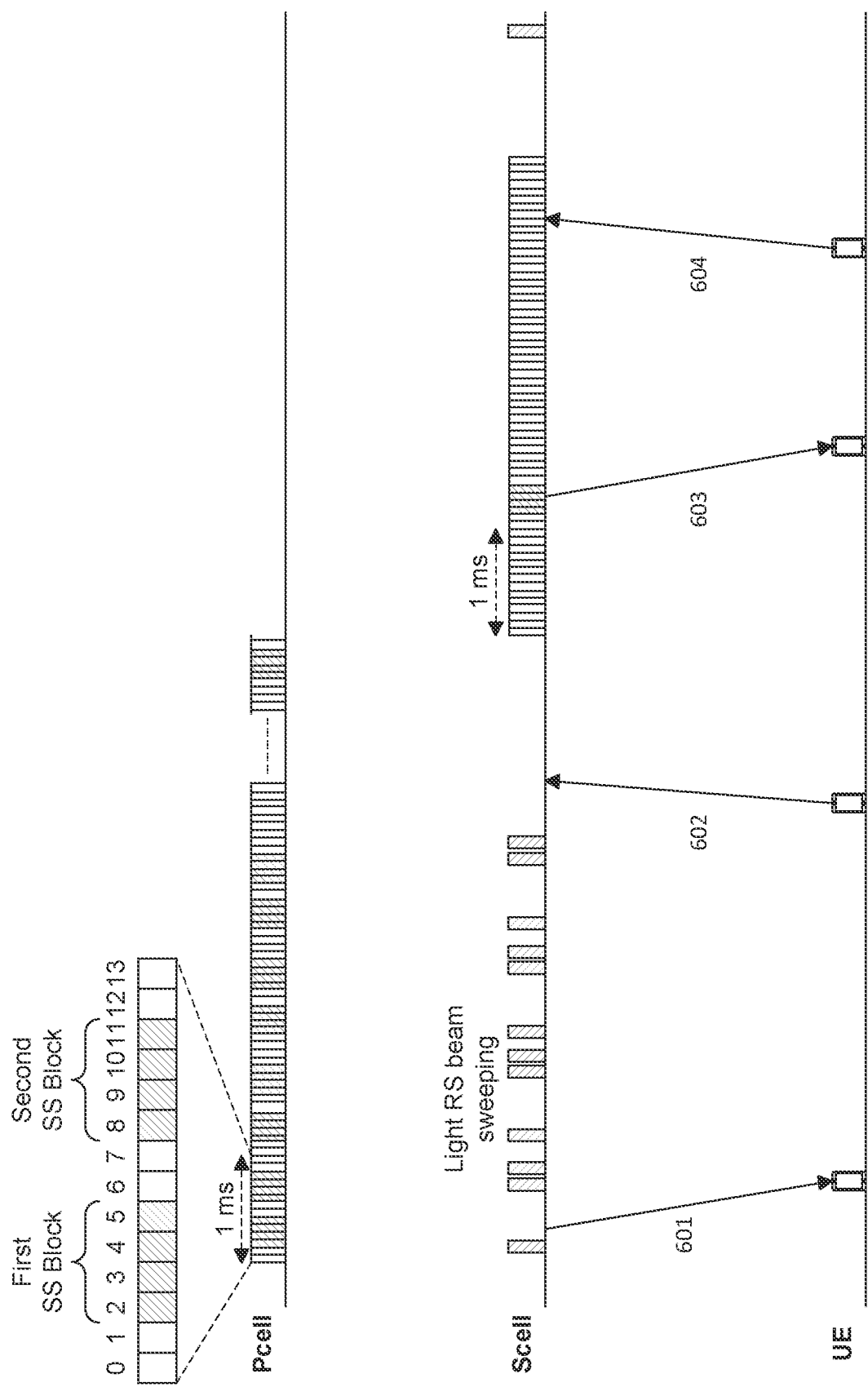
FIG. 6 illustrates a signal timing diagram of a DL-based configuration, according to an embodiment.

FIG. 6 illustrates a signal timing diagram of a DL-based configuration, according to an embodiment.

In step 601, an SCell transmits a light RS measurement to a UE. A full set of light RS may be swept in the cell in all possible beam directions to allow the UE to detect possible SCells.

In step 602, the UE transmits a RACH to the SCell. The UE may transmit RACH message 1 at the detected beam of the light RS to the SCell.

In step 603, the SCell transmits on-demand full SSB to the UE on a RACH beam. A full version of SSB may be transmitted at the beam in which the UE transmitted RACH.

In step 604, the UE transmits legacy random access to the SCell. The UE may perform the legacy random access on the SCell.

Figure 7:
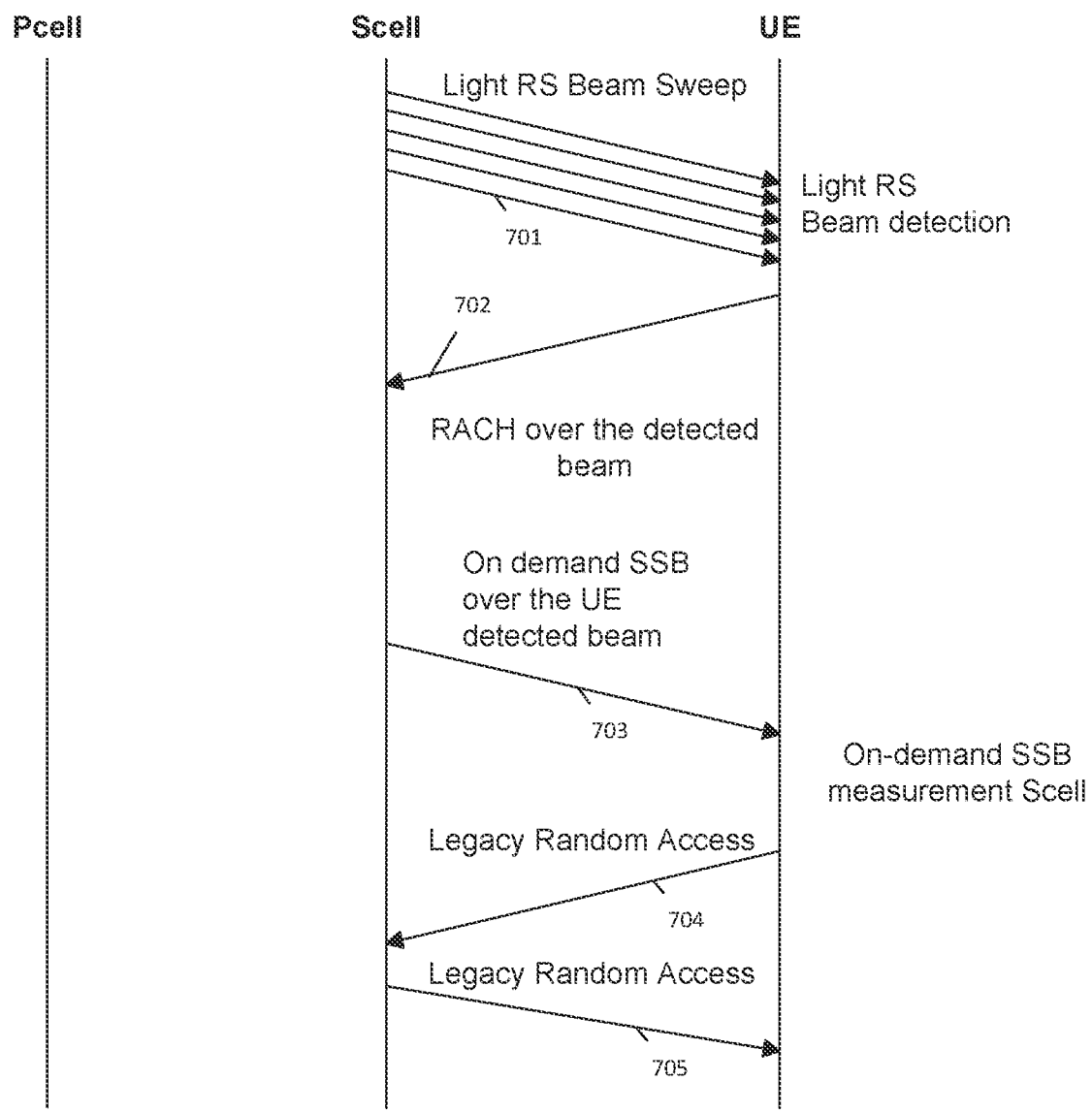
FIG. 7 illustrates a signaling exchange for a DL-based configuration, according to an embodiment.

FIG. 7 illustrates a signaling exchange for a DL-based configuration, according to an embodiment.

Referring to FIG. 7, in step 701 one or more light RSs are transmitted from an SCell to a UE to perform a beam sweep. Step 701 corresponds to step 601 in FIG. 6. The UE may move into the coverage of one or more SCells, while still being in an RRC-connected state with a PCell (a macro cell). The UE may be in an area where there is one or more SCells in a DTX "on" mode. In order to detect the SCells, the UE may receive a configuration from the network of the light RS configurations it can be expected to detect. The configuration can be provided by RRC signaling (dedicated or common), and may include a transmission periodicity for the light RS and the RS beam sweeping pattern, the frequency resources where the set of light RSs are transmitted, a time interval when the UE can be expected to receive the light RS, and/or a set of indexes of light RSs that uniquely identify each light RS beam.

The UE may start measuring the light RS beams (RSRP or RSSI) of all neighboring SCells, according to the received measurement configurations from the PCell. The measurement can start when the UE receives the light RS configuration. The light RS measurement can be activated or deactivated by a specific trigger (e.g., an MAC CE or DCI). The light RS measurement may include coarse acquisition of the cell in a DTX off state, and an RSRP measurement based on the REs occupied by the light RS.

The UE may measure the light RS beams in all possible directions and detect the best light RS beam (e.g., the light RS beam with the highest signal strength or the least amount of interference) with the best measured RSRP values.

At step 702, the UE transmits RACH over the detected beam. Step 702 corresponds to step 602 in FIG. 6. The UE may transmit RACH message 1 at the detected beam of the light RS to the SCell. The SCell may be woken up by receiving the RACH transmission from the UE.

At step 703, an on-demand SSB is transmitted to the UE over the beam detected by the UE. Step 703 corresponds to step 603 in FIG. 6. The full version of the legacy SSB may be transmitted by this SCell only at the beam in which the UE transmitted RACH. In this case, the energy of SCell can be reduced by avoiding the beam sweeping.

At step 704, a legacy random access signal is sent from the UE to the SCell. Step 704 corresponds to step 604 in FIG. 6. The UE may perform the legacy random access procedure on this SCell and perform legacy UL and DL transmissions thereafter.

At step 705, a legacy random access signal is sent from the SCell to the UE.

Figure 8:
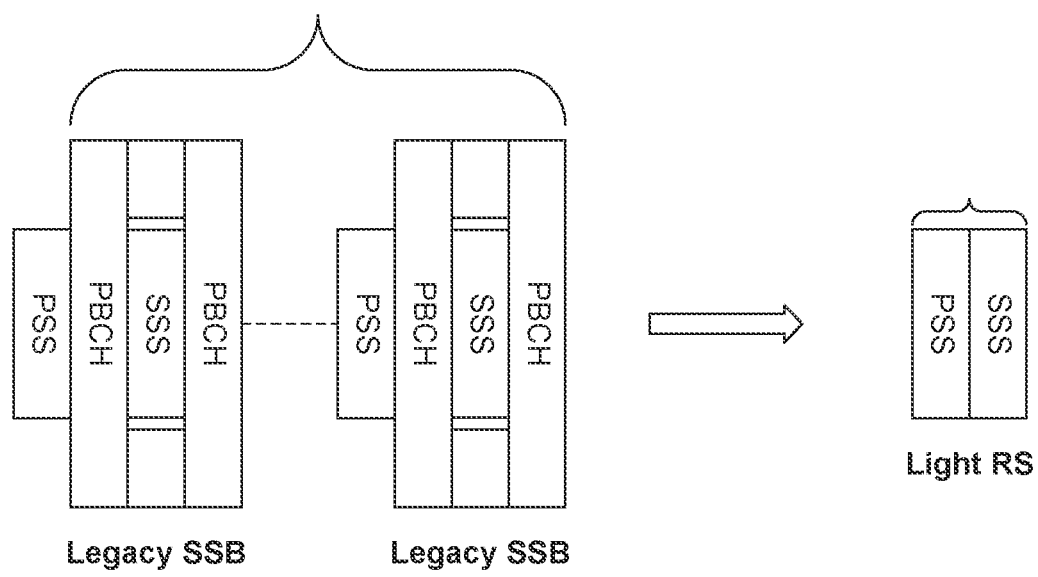
FIG. 8 illustrates a legacy single side band (SSB) signal and a light RS, according to an embodiment.

FIG. 8 illustrates a legacy SSB signal and a light RS, according to an embodiment.

Referring to FIG. 8, the light RS may include a primary synchronization signal (PSS) and a secondary synchronization signal (SSS) only, and no PBCH, which may provide frequency and time synchronization to an SCell. The light RS may not allow the SCell to perform full beam sweeping, and only one or a subset of beams may be used to transmit the light RS for a UE to discover SCells in a DTX mode. At this stage, the UE may identify a subset of potential good SCells (e.g., having a high signal strength) before performing the legacy RRM measurements. The PSS and SSS can occupy different symbols than their positions in the legacy SSB.

The light RS may also include the CSI-RS which is optional for transmission point (TRP) selection in MTRP SCells. Additionally or alternatively, the light RS may include the CSI-RS only, the PSS only, or the SSS only. Further, the light RS may be made up of a combination of other existing RSs (e.g., PTRS or PRS), or may even be a new reference signal not yet defined by 3GPP in Rel-18.

TRP identification (TPID) may include one or more of a physical cell ID (PCID) (UE may assume that CSI-RS of the TRP and a PSS/SSS corresponding to the PCID are QCLed), a CSI-RS scrambling ID, a CSI-RS resource indicator, a CSI-RS RE configuration, a CSI-RS slot offset relative to an SSS in the light RS.

TPID can also be provided via a pre-configured TCI state combined with SCell PCID detected by decoding a PSS and SSS, where each TRP may be mapped to one TCI state with one CSI-RS resource ID. TRP identification may be reported with the report of the corresponding CSI-RS based measurements.

Additionally, the light RS may be made up of an existing SSB with the PBCH and PBCH demodulation reference signal (DMRS) having been removed. To achieve backward compatibility, one option may be to not transmit PBCH data REs while still transmitting a PSS, an SSS, and PBCH DMRS following legacy SSB.

The light RS can be a single legacy SSB signal transmission. In this case, by reusing the legacy SSB signal design, the SCell may alternate between transmitting a single SSB for SCell detection and transmitting SSBs in repetition (triggered by DCI or MAC CE) for legacy beam sweeping of RRM measurements. The UE may be configured by a PCell with two different measurement configurations for SCell detection and legacy RRM measurements.

In addition, a legacy UE can detect a PSS, however it may not be able to decode a light RS. The legacy UE may try to detect an SSS, but may fail due to a different physical mapping. This may cause considerable delays and issues for legacy UEs. To avoid this, one solution may be to designate special sync raster locations for light RSs where the Rel-18 UE will decode the light RS. Additionally, some aspects of the PSS may be altered to avoid detection by legacy UEs. For example, some specific Zadoff-Chu (ZC) or m sequences may be used (or reserved) for the PSS to transmit the light RS. PSS sequences may be generated by the basic length-127 m-sequence cyclic shifted by 0, 43 or 86 steps to generate the required (e.g., 1 out of 3) m-sequences of PSS sequences.

For light RS, a set of light PSS sequences may be extended by a set of different cyclic shifts of an m-sequence other than 0, 43, and 86 steps in a legacy PSS, such that a legacy UE may not detect those light PSS sequences, thereby avoiding confusion during the blind cell search process. For instance, to avoid misdetection in noisy environments, a set of light RS specific PSS sequences may have cyclic shifts of 43 steps apart from the legacy PSS sequences and 43 steps apart from each other. In another instance, since legacy uses 0, 43, and 86 steps, a shift by 22 may use 22, 45, and 108 steps. Other solutions that ensure that the light RS is different than the PSS can be used as well (e.g., use of sequences other than ZC, "scrambling" of the PSS by another sequence) alone or in combination with one or more of the disclosed solutions.

Additionally, if the UE is capable of detecting a positioning reference signal (PRS), the UE may be capable of detecting PRS as a light RS.

A PCell may indicate the physical resource location of a set of PRSs in the carriers where the SCells are operating using the light RS. The signaling may be similar to the signaling done for OTDOA-NeighborCellInfoElement (e.g., an expected time of arrival (field equivalent to expectedRSTD) and a time window (field equivalent to expectedRSTD-Uncertainty) are indicated). Each PRS may be associated with a unique index.

The UE may report to the gNB on the PCell about which PRSs are received above a certain threshold.

Accordingly, a solution using the PRS or a PRS-like sequence can be used as well, with the PRS or PRS-like sequence acting as the WUS. More specifically, the legacy PRS may be configured directly to a UE via a location server, using a gNB as a relay. In some embodiments, the PCell may pre-configure a set of PRSs in specific physical resources to UEs, each corresponding to an SCell and/or a TRP. The information element (IE) could be similar to the IE of OTDOA-ReferenceCellInfo or OTDOA-NeighborCellInfoList. For example, an IE can be configured by the PCell via RRC signaling to UEs based on the following sequence:

```
-- ASN1START
Scell-NeighbourCellInfoList ::= SEQUENCE (SIZE (1..maxFreqLayers)) OF Scell-NeighbourFreqInfo
Scell-NeighbourFreqInfo  ::= SEQUENCE (SIZE (1..24)) OF Scell-NeighbourCellInfoElement
Scell-NeighbourCellInfoElement ::= SEQUENCE {
    physCellId                      INTEGER (0..503),
    earfcn                            ARFCN-ValueEUTRA OPTIONAL,         -- Cond NotSameAsRef0
    cpLength                        ENUMERATED {normal, extended, ...}
                                                      OPTIONAL,         -- Cond NotSameAsRef1
    prsInfo                          PRS-Info             OPTIONAL,     -- Cond NotSameAsRef2
    antennaPortConfig              ENUMERATED {ports-1-or-2, ports-4, ...}
                                                      OPTIONAL,         -- Cond NotsameAsRef3
    slotNumberOffset                INTEGER (0..19)     OPTIONAL,     -- Cond NotSameAsRef4
    prs-SubframeOffset              INTEGER (0..1279)    OPTIONAL,     -- Cond InterFreq
    expectedRSTD                    INTEGER (0..16383),
    expectedRSTD-Uncertainty        INTEGER (0..1023),
    ...,
    [[ earfcn-v9a0                    ARFCN-ValueEUTRA-v9a0  OPTIONAL      -- Cond NotSameAsRef5
    ]],
    [[ tpId-r14                       INTEGER (0..4095)    OPTIONAL,     -- Need ON
         prs-only-tp-r14              ENUMERATED { true }  OPTIONAL,       -- Cond TBS
         cpLengthCRS-r14              ENUMERATED { normal, extended, ... }
                                                      OPTIONAL,           -- Cond CRS
         sameMBSFNconfigNeighbour-r14 BOOLEAN              OPTIONAL,     -- Need ON
         dlBandwidth-r14              ENUMERATED {n6, n15, n25, n50, n75, n100}
                                                      OPTIONAL,         -- Cond NotSameAsRef6
         addPRSconfigNeighbour-r14 SEQUENCE (SIZE (1..maxAddPRSconfig-r14)) OF
                                         Add-PRSconfigNeighbourElement-r14
                                                      OPTIONAL          -- Need ON
    ]],
    [[
    ]]
}
Add-PRSconfigNeighbourElement-r14 ::= SEQUENCE {
    add-prsInfo-r14                 PRS-Info             OPTIONAL,     -- Cond NotSameAsRef7
    ...
}
-- ASN1STOP
```

Additionally, DCI may be configured to improve network energy saving as well. An SCell DTX on/off DCI indication may be sent over a PCell to a UE. The DCI can be a group-common DCI where each block of the DCI corresponds to one UE. In each block, the set of SCells in a DTX "on" or "off" state may be respectively mapped via a "1" or "0" bitmap. The bitmap of the set of SCells in the DCI may correspond to the set of SCells over which the UE performs a light RS measurement report. The DCI may also include the set of TRPs of a given SCell which are either in a DTX "on" or "off" state. An example of a bitmap for a UE is shown below in Table 1.

TABLE 1

|      | SCell1 | SCell2 | SCell3 | SCell4 | SCell5 |
|------|--------|--------|--------|--------|--------|
| TRP1 | 1      | 1      | 0      | 0      | 0      |
| TRP2 | 1      | 1      | 0      | 0      | 0      |
| TRP3 | 0      | 1      | 1      | 0      | 0      |
| TRP4 | 0      | 1      | 0      | 0      | 0      | where "0" represents a DTX "off" state and "1" represents a DTX "on" state.

When an SCell is in a DTX "off" state, the UE may measure the RSRP and RSSI of the light RS. Before the UE performs a measurement, the UE may be configured with the measurement configuration via a PCell.

Signaling of the light RS measurement timing configuration (LMTC) (for a frequency) may include an LMTC period and offset, a light RS occasion duration (common to all SCells for a given frequency), a measurement bandwidth, a set of TCI states for each light RS, a neighbor cells list (PCIDs), and a neighbor TRPs list including TRP identification information for each TRP and all CSI-RS parameters for TRP identification.

A UL-based approach relying on the UE sending a WUS to the SCell may be used. The SCell may monitor the WUS and determine if it should wake up or not. The UE may have more flexibility to determine when to transmit the WUS and can transmit the WUS only when desired, which may utilize a higher UE transmission power since the UE may transmit the light RSs.

Figure 9:
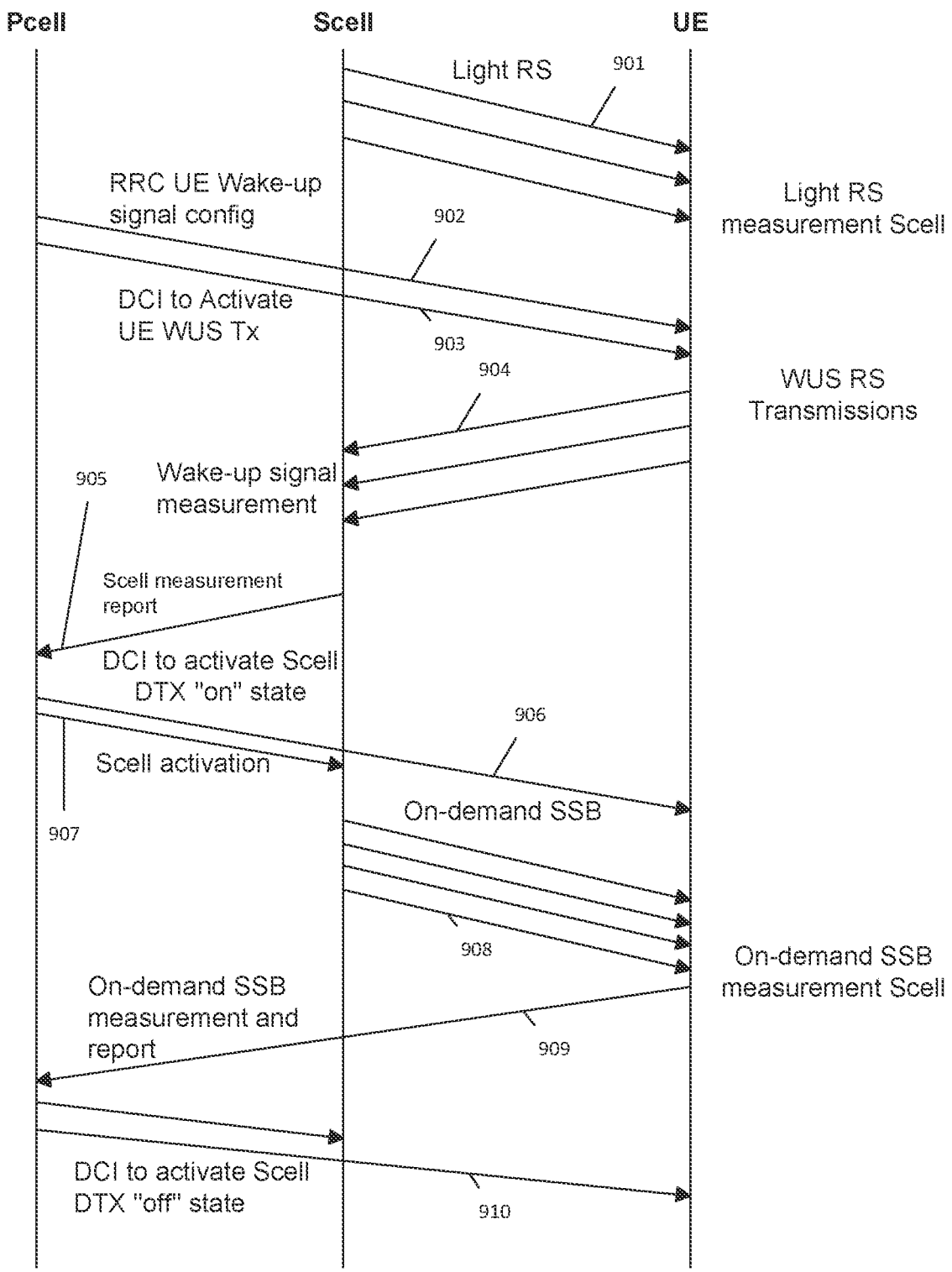
FIG. 9 illustrates a signaling exchange for an uplink (UL)-based configuration, according to an embodiment.

FIG. 9 illustrates a signaling exchange for a UL-based configuration, according to an embodiment.

Referring to FIG. 9, a light RS is sent from the SCell and received by the UE in step 901. The light RS may be a synchronization signal. The UE may have coarse timing from the SCell. Thus, the UE may obtain synchronization information from the SCell. This can be done by having a light synchronization signal similar to the light RS periodically sent by the SCell. The SCell may not transmit the SSB, and the periodicity of this synchronization signal can be large. Even for unsynchronized networks, the UE may not receive the light RS. For instance, the PCell can indicate an offset value between its timing and the SCell timing, and the UE may transmit a RACH to the SCell.

The PCell transmits RRC to the UE in step 902. The RRC may configure the UE with specific WUSs. For example, the WUS can be specific contention free msg1 (e.g., a specific preamble combined with a dedicated RO resource). There can be multiple WUSs having different preambles and RO combinations transmitted by the UE with different UL beams in all possible beam directions to wake up the candidate SCells. The WUS can also be a UL sounding reference signal (SRS). There may be predefined light_RS-WUS resource mapping, similar to PRACH-SSB association. In this case, the UE may decode a set of DL light RS beams and transmit the WUS with the UL beam QCLed type-D with a received light RS beam of the strongest RSRP in the mapped corresponding WUS occasion. Thus, the SCell can then determine the optimal WUS reception beam based on the received signal for the WUS occasion, similar to PRACH to SBB mapping.

In addition, other signals may be used instead of the RRC WUS. For example, the WUS may be an SRS (with possibly a new SRS usage that is not presently defined by 3GPP in Rel-18), or a newly defined RS. Parameters similarly configured may include time-frequency resources on where to transmit the RS (aperiodic transmission could also be used (like for CSI-RS)) and/or a resource index.

In step 903, the PCell transmits DCI to the UE. The DCI transmitted to the UE in step 903 may activate the UE. The PCell may RRC configure "always allowed" WUS for the UEs, where the network configures WUS occasions infrequently enough to do soft wake-up for UE WUS transmission periodically via MAC CE.

In addition, other signals may be used instead of the RRC WUS (e.g., an SRS (with possibly a new SRS usage being defined), or a newly defined RS). Parameters similarly configured may include time-frequency resources on where to transmit the RS (aperiodic transmission could also be used (like for CSI-RS)) and/or a resource index.

In step 904, the UE transmits at least one WUS to the SCell. The UE may transmit one or more WUSs in a set of UL beams based on the previous DL light RS measurements from a set of SCells or TRPs. For example, the UE may transmit the WUS with one or more UL beams QCLed type-D with the QCL type-D sources of the received set of DL light RS beams with the strongest received RSRPs. For a potential SCell to detect the WUS from a UE, The SCell can perform detection without any optimal tuning of the reception beam, or determine if the WUS reception with the beam corresponds to the selected transmission beam of a WUS in a given WUS occasion (e.g., a particular frequency and time resource), according to pre-defined light_RS-WUS resource mapping, similar to a PRACH-SSB association. In the latter case (if determining whether the WUS reception with the beam corresponds to the selected transmission beam of a WUS in a given WUS occasion), the UE may decode a set of DL light RS beams and then transmit the WUS with the UL beam QCLed type-D with a received light RS beam of the strongest received RSRP in the mapped WUS occasion. The SCell may then determine the WUS reception beam based on the received signal in the WUS occasion. The SCell WUS detection can be one shot and there may be no follow-up UL reception until the SCell becomes active and selected as the serving SCell to perform legacy procedures. Thus, SCell blind detection of a WUS may be an alternative. The latter approach may have better performance since it provides gNB info about which reception beam to use, thus it can provide better received signal quality.

Additionally, the UE transmission to the WUS may include the light RS configuration having a periodicity and resources for the UE to transmit the light RS. After the light RS configuration is received, the UE may perform a transmission on each transmission opportunity indicated by the light RS (possibly after activation or deactivation, similar to semi-persistent scheduling (SPS) configuration).

The WUS transmission may be activated by the gNB using either DCI or a MAC CE. The activation may be for one particular WUS corresponding to a particular SCell.

The UE may independently decide whether to transmit the WUS. For instance, if a signal from an SCell is received with sufficient power or quality, the UE may decide not to transmit the WUS.

In step 905, the SCell transmits an SCell measurement report to the PCell. In step 906, the PCell transmits DCI to the UE. The DCI may activate the DTX "on" state. In step 907, the PCell transmits an SCell activation signal to the SCell. The SCell may be configured to monitor for a UL WUS for a predefined period of time.

In response to receiving an indication that the SCell is activated (e.g., in response to receiving the DCI in step 906), the UE may stop transmitting the WUS if the UE is awoken.

In step 908, the SCell transmits one or more on-demand SSB measurement signals to the UE. In step 909, the UE transmits an on-demand SSB measurement and report to the PCell. In step 910, the PCell transmits DCI to switch the SCell DTX state to "off".

Figure 10:
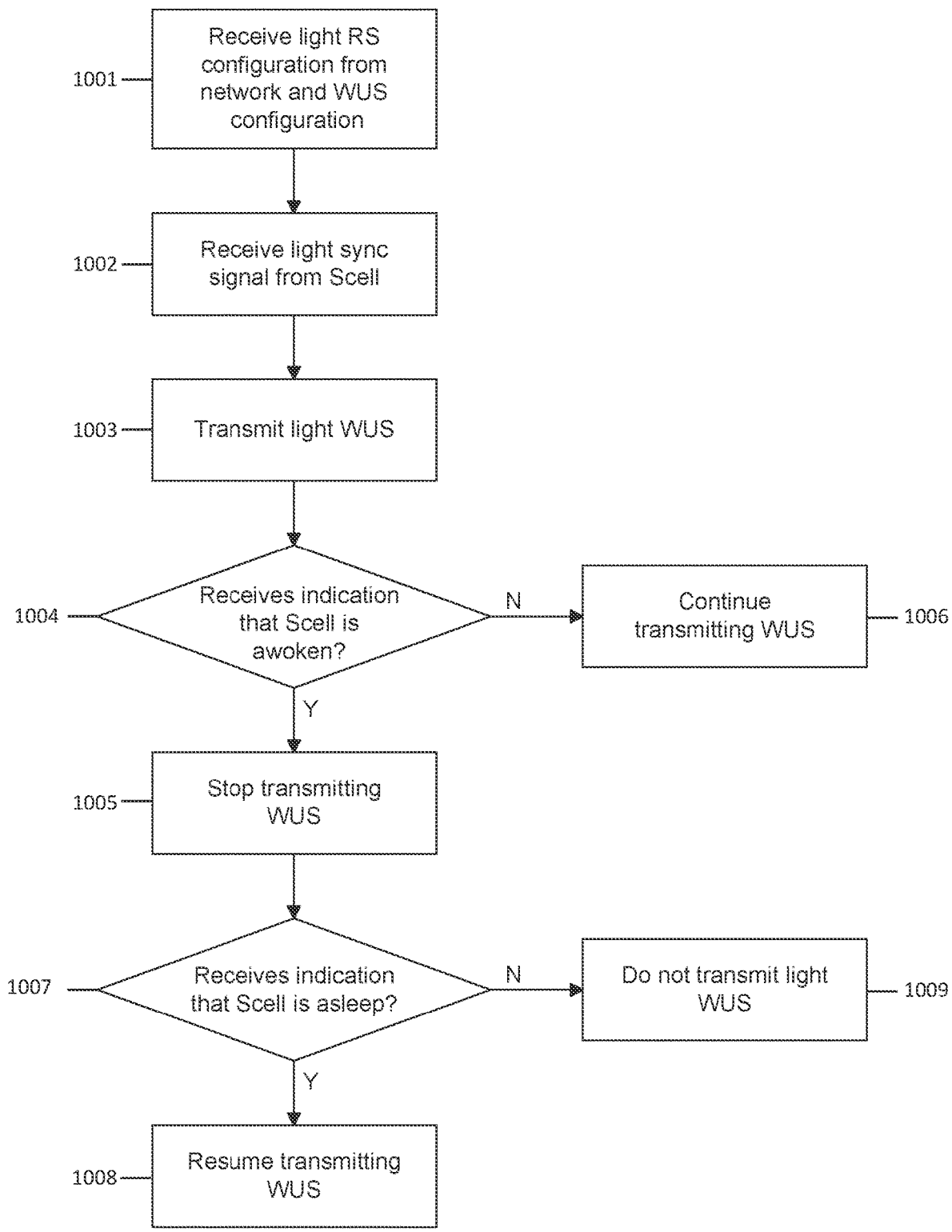
FIG. 10 illustrates a flowchart of a method for a UL-based configuration, according to an embodiment.

FIG. 10 illustrates a flowchart of a method for a UL-based configuration, according to an embodiment.

The steps of FIG. 10 may be performed by a UE, a processor, a controller, or another electronic device.

Referring to FIG. 10, an RS (or a light RS) and a WUS configuration are received by a UE in step 1001. The RS may be transmitted from an SCell and the RRC may be transmitted from a PCell.

In step 1002, the UE receives a light sync signal from the SCell. The light sync signal may be a signal to initiate WUS transmission by the UE on a carrier frequency where an SSB is not detected in an inactive state. In step 1003, the UE transmits a WUS (or a light WUS). Transmitting the light WUS may cause the SCell to obtain a measurement. In step 1004, the UE determines whether an indication that the SCell is awoken has been received. The indication may be received if, for instance, the obtained measurement is greater than a predetermined value (e.g., an RSRP threshold value). If the indication is received, then in step 1005, the UE stops transmitting WUS. In this case, the UE may receive a signal from the PCell indicating to stop transmitting the WUS. In addition, the UE may receive at least one SSB on the carrier frequency based on the measurement. On the other hand, if the indication is not received, then in step 1006, the UE continues transmitting WUS.

After stopping transmitting WUS in step 1005, the UE determines whether an indication that the SCell is asleep is received in step 1007. If the indication is received, the UE resumes transmitting WUS in step 1008. If the indication is not received, the UE does not transmit light WUS.

A green field network deployment is a type of network deployment in which a new network is built from scratch in an area where there was no previous network infrastructure. Green field deployments are often used when setting up a network in a new location, or when there is a high demand for the increased speeds and capacity. They offer the opportunity to design and build the network from the ground up, taking into account the specific needs and requirements.

A difference between green field network deployment and other network deployment scenarios is that the PCells and PSCells also may support a DTX mode in a green field network with light RS transmitted in the deactivated mode. Thus, all the UEs on the network may be Rel-18 capability UEs. In addition, backward capability to support Rel-17 UEs may or may not be supported by the network.

Figure 11:
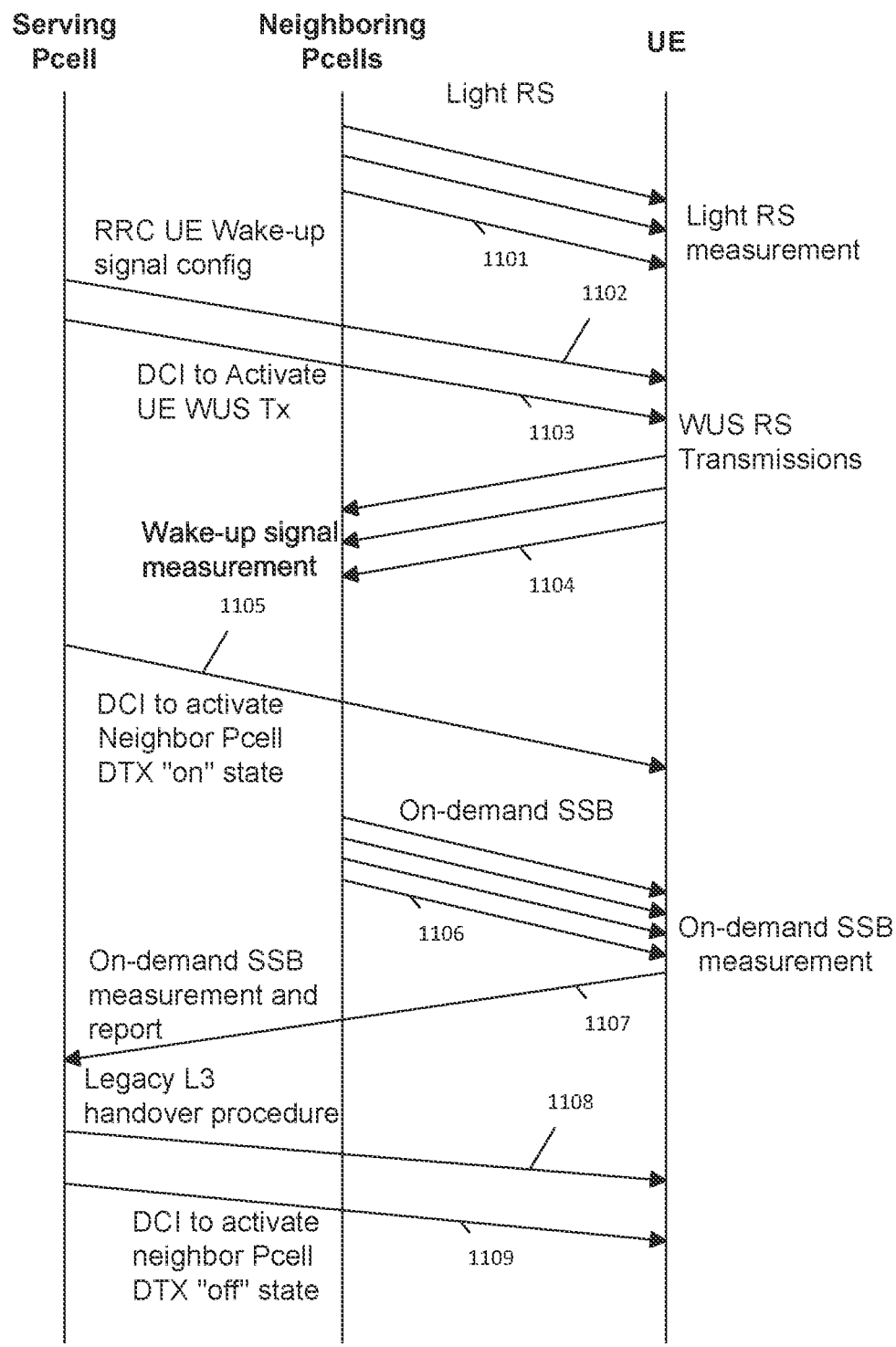
FIG. 11 illustrates a signaling exchange for a UL-based configuration, according to an embodiment.

FIG. 11 illustrates a signaling exchange for a UL-based configuration, according to an embodiment.

The solution disclosed in FIG. 11 may be for a green field Rel-18 deployment scenario with L3 handover capabilities.

Referring to FIG. 11, in step 1101 one or more light RSs are transmitted from an SCell to a UE. In step 1102, the serving PCell transmits an RRC signal to the UE. The RRC signal may configure the UE with the specific WUS. For example, a WUS can be a specific contention free msg1 (e.g., a specific preamble combined with a dedicated RO resource). There can be a plurality of WUSs, each having a different preamble and RO combination transmitted by the UE with different UL beams, in order to wake up the candidate neighboring PCells in all possible beam directions. The WUS can also be a UL SRS. There can be pre-defined light_RS-WUS resource mapping, similar to PRACH-SSB association. In this case, the UE may decode a set of DL light RS beams and transmit a WUS with the UL beam QCLed type-D with a received light RS beam of the strongest received RSRP in the mapped corresponding WUS occasion. Thus, neighboring PCells can then determine the optimal WUS reception beam based on the received signal in the used WUS occasion, similar to PRACH to SBB mapping.

In step 1103, the PCell transmits DCI to the UE. The serving PCell may activate the UE via DCI to transmit a WUS. The serving PCell may use the RRC to configure "always allowed" WUS for the UEs, where the network configures WUS occasions infrequently enough such that it can achieve a soft wake-up for UE WUS transmission periodically via MAC CE.

In step 1104, the UE transmits at least one WUS measurement signal. The UE may transmit one or more WUSs in a set of UL beams based on the previous DL light RS measurements from a set of neighboring PCells or TRPs. For example, the UE may transmit the WUS with one or more UL beams QCLed type-D with the QCL type-D sources of the received set of DL light RS beams with the strongest received RSRPs. For a potential candidate PCell to detect the WUS from UE, it can either do blind detection without any optimal tuning of the reception beam, or determine if the WUS reception with the beam corresponds to the selected WUS transmission beam in a given WUS occasion (e.g., a particular frequency and time resource), according to a predefined light_RS-WUS resource mapping, similar to PRACH-SSB association. In the latter case (if the WUS reception with the beam corresponds to the selected WUS transmission beam in a given WUS occasion (e.g., a particular frequency and time resource)), the UE may decode a set of DL light RS beams and transmit the WUS with the UL beam QCLed type-D with a received light RS beam of the strongest received RSRP in the mapped WUS occasion. Thus, a candidate PCell may then determine the WUS reception beam based on the received signal in the WUS occasion. For the candidate PCell, the WUS detection can be one shot and there is no follow-up UL reception until the candidate PCell becomes active and selected as the serving PCell to perform legacy procedures. The latter approach may provide better received signal quality since it provides a gNB information about which reception beam to use, thus it may provide better received signal quality.

In step 1105, the UE receives DCI from the PCell. In this step, the UE may receive a new DCI or a MAC CE from a serving PCell for activating the on-demand legacy SSB reception. The serving PCell may determine a subset of neighboring PCells from all neighboring PCells that can be candidate serving cells for the UE based on neighboring PCell WUS measurements.

In step 1106, on-demand SSB is transmitted from neighboring PCells to the UE. The UE may perform legacy SSB based RRM measurements and perform DL or UL data transmissions until the UE receives a new DCI or MAC CE from serving PCell for activating the light RS transmissions again.

In step 1107, the serving cell receives an on-demand SSB measurement and report. In step 1108, the SCell UE transmits legacy L3 handover procedure signals to the UE. In step 1109, the SCell transmits DCI to activate a neighbor PCell DTX "off" state to the UE.

In addition, the UE may not switch to legacy SSB reception after receiving DCI or a MAC CE. The UE may continuously receive light RS from a neighboring PCell to perform RRM measurements, but with a different light RS configuration than for 1st stage cell discovery. For example, the different light RS configuration may enable the neighboring PCell and/or the UE to perform beam sweeping procedures, where the light RS is transmitted in repetition with different beams.

Figure 12:
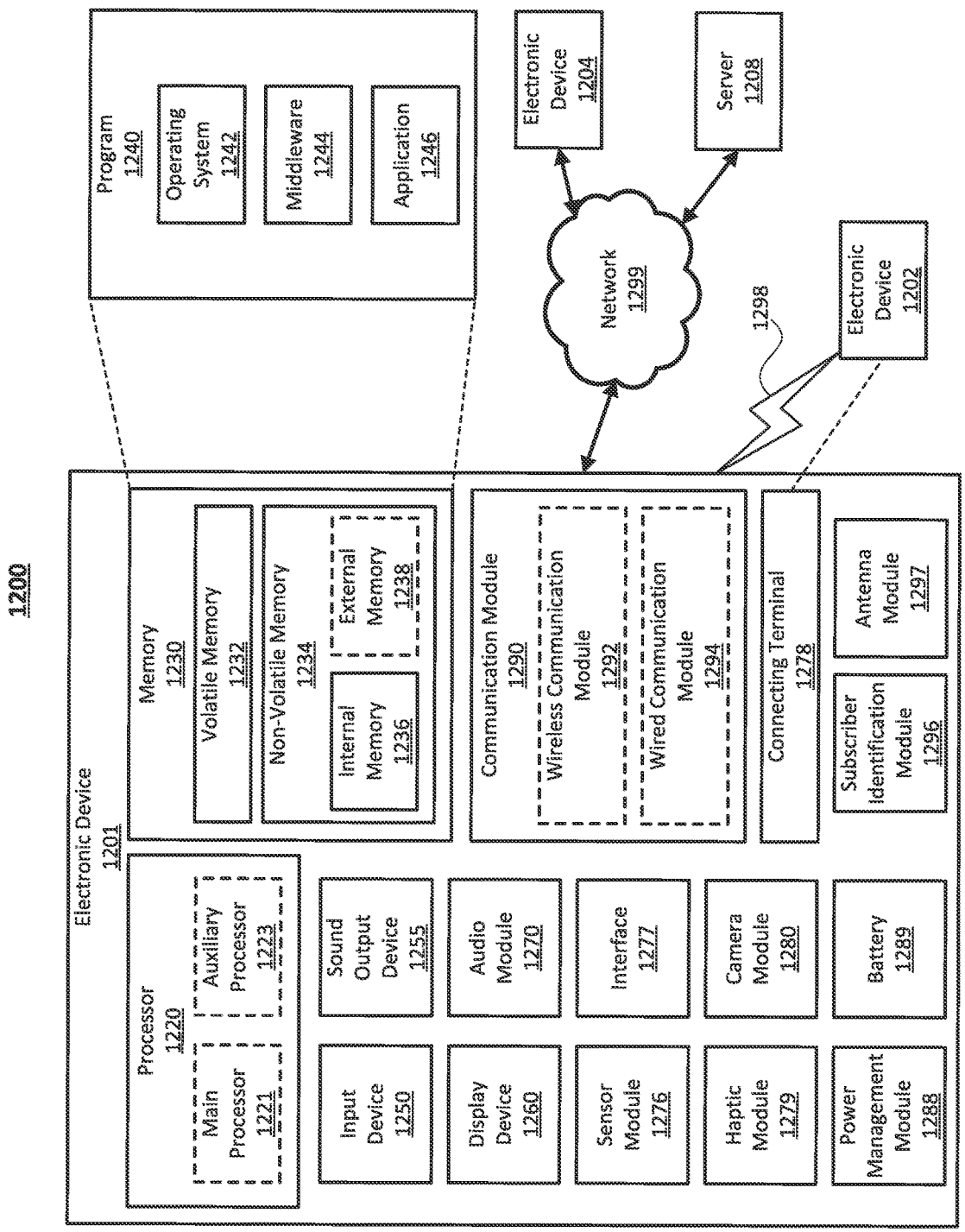
FIG. 12 is a block diagram of an electronic device in a network environment, according to an embodiment.

FIG. 12 is a block diagram of an electronic device in a network environment 1200, according to an embodiment.

Referring to FIG. 12, an electronic device 1201 in a network environment 1200 may communicate with an electronic device 1202 via a first network 1298 (e.g., a short-range wireless communication network), or an electronic device 1204 or a server 1208 via a second network 1299 (e.g., a long-range wireless communication network). The electronic device 1201 may communicate with the electronic device 1204 via the server 1208. The electronic device 1201 may include a processor 1220, a memory 1230, an input device 1240, a sound output device 1255, a display device 1260, an audio module 1270, a sensor module 1276, an interface 1277, a haptic module 1279, a camera module 1280, a power management module 1288, a battery 1289, a communication module 1290, a subscriber identification module (SIM) card 1296, or an antenna module 1294. In one embodiment, at least one (e.g., the display device 1260 or the camera module 1280) of the components may be omitted from the electronic device 1201, or one or more other components may be added to the electronic device 1201. Some of the components may be implemented as a single integrated circuit (IC). For example, the sensor module 1276 (e.g., a fingerprint sensor, an iris sensor, or an illuminance sensor) may be embedded in the display device 1260 (e.g., a display).

The processor 1220 may execute software (e.g., a program 1240) to control at least one other component (e.g., a hardware or a software component) of the electronic device 1201 coupled with the processor 1220 and may perform various data processing or computations.

As at least part of the data processing or computations, the processor 1220 may load a command or data received from another component (e.g., the sensor module 1246 or the communication module 1290) in volatile memory 1232, process the command or the data stored in the volatile memory 1232, and store resulting data in non-volatile memory 1234. The processor 1220 may include a main processor 1221 (e.g., a central processing unit (CPU) or an application processor (AP)), and an auxiliary processor 1223 (e.g., a graphics processing unit (GPU), an image signal processor (ISP), a sensor hub processor, or a communication processor (CP)) that is operable independently from, or in conjunction with, the main processor 1221. Additionally or alternatively, the auxiliary processor 1223 may be adapted to consume less power than the main processor 1221, or execute a particular function. The auxiliary processor 1223 may be implemented as being separate from, or a part of, the main processor 1221.

The auxiliary processor 1223 may control at least some of the functions or states related to at least one component (e.g., the display device 1260, the sensor module 1276, or the communication module 1290) among the components of the electronic device 1201, instead of the main processor 1221 while the main processor 1221 is in an inactive (e.g., sleep) state, or together with the main processor 1221 while the main processor 1221 is in an active state (e.g., executing an application). The auxiliary processor 1223 (e.g., an image signal processor or a communication processor) may be implemented as part of another component (e.g., the camera module 1280 or the communication module 1290) functionally related to the auxiliary processor 1223.

The memory 1230 may store various data used by at least one component (e.g., the processor 1220 or the sensor module 1276) of the electronic device 1201. The various data may include, for example, software (e.g., the program 1240) and input data or output data for a command related thereto. The memory 1230 may include the volatile memory 1232 or the non-volatile memory 1234.

The program 1240 may be stored in the memory 1230 as software, and may include, for example, an operating system (OS) 1242, middleware 1244, or an application 1246.

The input device 1250 may receive a command or data to be used by another component (e.g., the processor 1220) of the electronic device 1201, from the outside (e.g., a user) of the electronic device 1201. The input device 1250 may include, for example, a microphone, a mouse, or a keyboard.

The sound output device 1255 may output sound signals to the outside of the electronic device 1201. The sound output device 1255 may include, for example, a speaker or a receiver. The speaker may be used for general purposes, such as playing multimedia or recording, and the receiver may be used for receiving an incoming call. The receiver may be implemented as being separate from, or a part of, the speaker.

The display device 1260 may visually provide information to the outside (e.g., a user) of the electronic device 1201. The display device 1260 may include, for example, a display, a hologram device, or a projector and control circuitry to control a corresponding one of the display, hologram device, and projector. The display device 1260 may include touch circuitry adapted to detect a touch, or sensor circuitry (e.g., a pressure sensor) adapted to measure the intensity of force incurred by the touch.

The audio module 1270 may convert a sound into an electrical signal and vice versa. The audio module 1270 may obtain the sound via the input device 1250 or output the sound via the sound output device 1255 or a headphone of an external electronic device 1202 directly (e.g., wired) or wirelessly coupled with the electronic device 1201.

The sensor module 1276 may detect an operational state (e.g., power or temperature) of the electronic device 1201 or an environmental state (e.g., a state of a user) external to the electronic device 1201, and then generate an electrical signal or data value corresponding to the detected state. The sensor module 1276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1277 may support one or more specified protocols to be used for the electronic device 1201 to be coupled with the external electronic device 1202 directly (e.g., wired) or wirelessly. The interface 1277 may include, for example, a high-definition multimedia interface (HDMI), a universal serial bus (USB) interface, a secure digital (SD) card interface, or an audio interface.

A connecting terminal 1278 may include a connector via which the electronic device 1201 may be physically connected with the external electronic device 1202. The connecting terminal 1278 may include, for example, an HDMI connector, a USB connector, an SD card connector, or an audio connector (e.g., a headphone connector).

The haptic module 1279 may convert an electrical signal into a mechanical stimulus (e.g., a vibration or a movement) or an electrical stimulus which may be recognized by a user via tactile sensation or kinesthetic sensation. The haptic module 1279 may include, for example, a motor, a piezoelectric element, or an electrical stimulator.

The camera module 1280 may capture a still image or moving images. The camera module 1280 may include one or more lenses, image sensors, image signal processors, or flashes. The power management module 1288 may manage power supplied to the electronic device 1201. The power management module 1288 may be implemented as at least part of, for example, a power management integrated circuit (PMIC).

The battery 1289 may supply power to at least one component of the electronic device 1201. The battery 1289 may include, for example, a primary cell which is not rechargeable, an SCell which is rechargeable, or a fuel cell.

The communication module 1290 may support establishing a direct (e.g., wired) communication channel or a wireless communication channel between the electronic device 1201 and the external electronic device (e.g., the electronic device 1202, the electronic device 1204, or the server 1208) and performing communication via the established communication channel. The communication module 1290 may include one or more communication processors that are operable independently from the processor 1220 (e.g., the AP) and supports a direct (e.g., wired) communication or a wireless communication. The communication module 1290 may include a wireless communication module 1292 (e.g., a cellular communication module, a short-range wireless communication module, or a global navigation satellite system (GNSS) communication module) or a wired communication module 1294 (e.g., a local area network (LAN) communication module or a power line communication (PLC) module). A corresponding one of these communication modules may communicate with the external electronic device via the first network 1298 (e.g., a short-range communication network, such as Bluetooth™, wireless-fidelity (Wi-Fi) direct, or a standard of the Infrared Data Association (IrDA)) or the second network 1299 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 1292 may identify and authenticate the electronic device 1201 in a communication network, such as the first network 1298 or the second network 1299, using subscriber information (e.g., international mobile subscriber identity (IMSI)) stored in the subscriber identification module 1296.

The antenna module 1297 may transmit or receive a signal or power to or from the outside (e.g., the external electronic device) of the electronic device 1201. The antenna module 1297 may include one or more antennas, and, therefrom, at least one antenna appropriate for a communication scheme used in the communication network, such as the first network 1298 or the second network 1299, may be selected, for example, by the communication module 1290 (e.g., the wireless communication module 1292). The signal or the power may then be transmitted or received between the communication module 1290 and the external electronic device via the selected at least one antenna.

Commands or data may be transmitted or received between the electronic device 1201 and the external electronic device 1204 via the server 1208 coupled with the second network 1299. Each of the electronic devices 1202 and 1204 may be a device of a same type as, or a different type, from the electronic device 1201. All or some of operations to be executed at the electronic device 1201 may be executed at one or more of the external electronic devices 1202, 1204, or 1208. For example, if the electronic device 1201 should perform a function or a service automatically, or in response to a request from a user or another device, the electronic device 1201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 1201. The electronic device 1201 may provide the outcome, with or without further processing of the outcome, as at least part of a reply to the request. To that end, a cloud computing, distributed computing, or client-server computing technology may be used, for example.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method, performed by a UE to perform communication, the method comprising:
   receiving a light reference signal (RS) on a carrier frequency where a synchronization signal block (SSB) is not detected;
   in response to receiving the light RS, obtaining a light RS measurement and transmitting a light RS measurement report based on the light RS measurement; and
   starting to receive at least one SSB on the carrier frequency based on the light RS measurement report.

2. The method of claim 1, further comprising:
   receiving, from a primary cell (PCell), downlink control information (DCI) that indicates that the UE is to activate a discontinuous transmission (DTX) "on" mode for the UE to receive the at least one SSB on the carrier frequency; and
   activating the DTX "on" mode in response to receiving the DCI.

3. The method of claim 2, further comprising:
   receiving, from the PCell, DCI that indicates that the UE is to activate a DTX "off" mode for the UE to stop receiving the at least one SSB on the carrier frequency; and
   activating the DTX "off" mode in response to receiving the DCI.

4. The method of claim 1, further comprising:
   receiving a radio resource control (RRC) signal identifying a configuration of the light RS,
   wherein the RRC signal includes at least one of a transmission periodicity for the light RS, a frequency resource for the light RS, a time interval for the light RS, an index that identifies the light RS, and a corresponding synchronization signal block (SSB) quasi co-location (QCL) for the light RS.

5. The method of claim 1, wherein the light RS includes a primary synchronization signal (PSS) and a secondary synchronization signal (SSS) and does not include a physical broadcast channel (PBCH).

6. A user equipment (UE) configured to perform communication, the UE comprising:
a processor; and
a memory storing program instructions that, when executed by the processor, configure the UE to:
receive a light reference signal (RS) on a carrier frequency where a synchronization signal block (SSB) is not detected,
in response to receiving the light RS, obtain a light RS measurement and transmit a light RS measurement report based on the light RS measurement, and
start to receive at least one SSB on the carrier frequency based on the light RS measurement report.

7. The UE of claim 6, wherein the instructions, when executed by the processor, further configure the UE to:
receive, from a primary cell (PCell), downlink control information (DCI) that indicates that the UE is to activate a discontinuous transmission (DTX) "on" mode for the UE to receive the at least one SSB on the carrier frequency, and
activate the DTX "on" mode in response to receiving the DCI.

8. The UE of claim 7, wherein the instructions, when executed by the processor, further configure the UE to:
receive, from the PCell, DCI that indicates that the UE is to activate a DTX "off" mode for the UE to stop receiving the at least one SSB on the carrier frequency, and
activate the DTX "off" mode in response to receiving the DCI.

9. The UE of claim 6, wherein the instructions, when executed by the processor, further configure the UE to:
receive a radio resource control (RRC) signal identifying a configuration of the light RS,
wherein the RRC signal includes at least one of a transmission periodicity for the light RS, a frequency resource for the light RS, a time interval for the light RS, an index that identifies the light RS, and a corresponding synchronization signal block (SSB) quasi co-location (QCL) for the light RS.

10. The UE of claim 6, wherein the light RS includes a primary synchronization signal (PSS) and a secondary synchronization signal (SSS) and does not include a physical broadcast channel (PBCH).

11. A method, performed by a UE, for activating a secondary cell (SCell), the method comprising:
receiving a reference signal (RS) to initiate a wake up signal (WUS) transmission on a carrier frequency where a synchronization signal block (SSB) is not detected;
in response to receiving the RS, transmitting a WUS to the SCell; and
starting to receive at least one SSB on the carrier frequency based on a WUS measurement obtained in response to the transmission of the WUS.

12. The method of claim 11, further comprising:
receiving, from a primary cell (PCell), downlink control information (DCI) that indicates that the UE is to activate a discontinuous transmission (DTX) "on" mode for the UE to receive the at least one SSB on the carrier frequency; and
activating the DTX "on" mode in response to receiving the DCI.

13. The method of claim 11, wherein the RS is a light RS and includes a primary synchronization signal (PSS) and a secondary synchronization signal (SSS) and does not include a physical broadcast channel (PBCH).

14. The method of claim 11, wherein the WUS is a preamble combined with a dedicated random access channel (RACH) occasion or dedicated sounding reference signals (SRSs).

15. The method of claim 11, wherein the signal to switch from the inactive state to the active state is, at least partially, downlink control information (DCI), and
wherein the DCI comprises a set of transmission points (TRPs) indicating an active or inactive state for a secondary cell (SCell).

16. A user equipment (UE) configured to activate a secondary cell (SCell), the UE comprising:
a processor; and
a memory storing program instructions that, when executed by the processor, configure the UE to:
receive a reference signal (RS) to initiate a wake up signal (WUS) transmission on a carrier frequency where a synchronization signal block (SSB) is not detected,
in response to receiving the RS, transmit a WUS to the SCell, and
start to receive at least one SSB on the carrier frequency based on a WUS measurement obtained in response to the transmission of the WUS.

17. The UE of claim 16, wherein the instructions, when executed by the processor, further configure the UE to:
receive, from a primary cell (PCell), downlink control information (DCI) that indicates that the UE is to activate a discontinuous transmission (DTX) "on" mode for the UE to receive the at least one SSB on the carrier frequency, and
activate the DTX "on" mode in response to receiving the DCI.

18. The UE of claim 16, wherein the RS is a light RS and includes a primary synchronization signal (PSS) and a secondary synchronization signal (SSS) and does not include a physical broadcast channel (PBCH).

19. The UE of claim 16, wherein the WUS is a preamble combined with a dedicated random access channel (RACH) occasion or dedicated sounding reference signals (SRSs).

20. The UE of claim 16, wherein the signal to switch from the inactive state to the active state is, at least partially, downlink control information (DCI), and
wherein the DCI comprises a set of transmission points (TRPs) indicating an active or inactive state for a secondary cell (SCell).

* * * * *